(12) United States Patent
Willemsen et al.

(10) Patent No.: US 11,208,251 B2
(45) Date of Patent: Dec. 28, 2021

(54) VALVE FOR A FLEXIBLE PACKAGING WITH AN AERATING AND/OR VENTING OPENING AND METHOD FOR AERATING AND/OR VENTING A FLEXIBLE PACKAGING

(71) Applicant: VQM PACKAGING B.V., Tiel (NL)

(72) Inventors: Evert Jan Willem Willemsen, Zeist (NL); Reinierus Maria Johannes Luyten, Montfoort (NL)

(73) Assignee: VQM PACKAGING B.V., Tiel (NL)

( * ) Notice: Subject to any disclaimer, the term of this patent is extended or adjusted under 35 U.S.C. 154(b) by 244 days.

(21) Appl. No.: 15/570,929

(22) PCT Filed: May 1, 2015

(86) PCT No.: PCT/NL2015/050301
§ 371 (c)(1),
(2) Date: Oct. 31, 2017

(87) PCT Pub. No.: WO2016/178558
PCT Pub. Date: Nov. 10, 2016

(65) Prior Publication Data
US 2018/0290808 A1 Oct. 11, 2018

(51) Int. Cl.
*B65D 77/22* (2006.01)
*B65B 31/04* (2006.01)
(Continued)

(52) U.S. Cl.
CPC ............ *B65D 77/225* (2013.01); *B65B 31/04* (2013.01); *B65D 77/062* (2013.01); *B65D 81/2038* (2013.01); *F16K 15/144* (2013.01)

(58) Field of Classification Search
None
See application file for complete search history.

(56) References Cited

U.S. PATENT DOCUMENTS 3,799,427 A * 3/1974 Goglio ................. B65D 77/225
383/103
5,398,481 A * 3/1995 Takeuchi .......... H01L 21/67772
53/405
(Continued)

FOREIGN PATENT DOCUMENTS

CN 102933884 A 2/2013
DE 202005011737 U1 11/2005
(Continued)

OTHER PUBLICATIONS

International Preliminary Report on Patentability dated Nov. 7, 2017; (PCT/NL2015/050301); 7 pages.

*Primary Examiner* — Hemant Desai
*Assistant Examiner* — Tanzim Imam
(74) *Attorney, Agent, or Firm* — Shay Glenn LLP

(57) ABSTRACT

The invention relates to a valve (4) for a flexible packaging (1), comprising a valve housing (11) to be connected to an aerating and/or venting opening (6) of the packaging and having a first opening (22) and an opposite second opening (35), and a flexible membrane (24) movable between a position which closes the first opening and a position which leaves the first opening clear. The valve is provided with guide means (28) for guiding the movement of the membrane, wherein there is space (40) in the housing adjacently of the membrane for the purpose of forming a passage between the first and second opening when the membrane takes up-its open position. The invention also relates to a flexible packaging with an aerating and/or venting opening and a valve arranged therein. The invention further relates to an assembly of an aerating and/or venting device and such a valve. The invention also relates to a method for evacuating a flexible packaging via a venting opening while making use of such a valve and a venting device connected thereto. The invention finally relates to a method for flushing (Continued)

Figure 1:
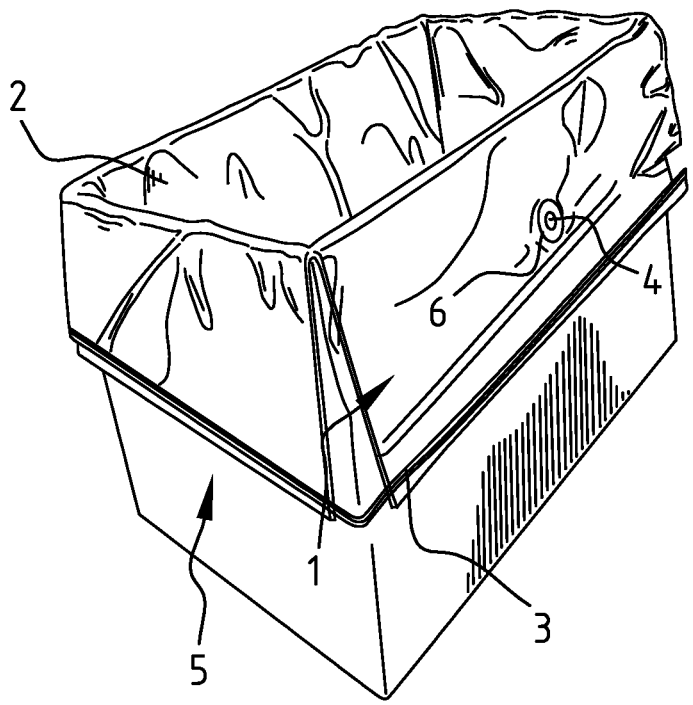

a flexible packaging with gas via an aerating and/or venting opening by making use of such a valve and an aerating and/or venting device connected thereto.

19 Claims, 6 Drawing Sheets

(51) Int. Cl.
    *B65D 77/06*     (2006.01)
    *B65D 81/20*     (2006.01)
    *F16K 15/14*     (2006.01)

(56) References Cited

U.S. PATENT DOCUMENTS

| | | | | |
|---|---|---|---|---|
| 6,056,439 | A * | 5/2000 | Graham | B65D 77/225 |
| | | | | 220/89.1 |
| 7,055,794 | B1 * | 6/2006 | Tang | B65D 81/2038 |
| | | | | 251/100 |
| 8,074,685 | B2 * | 12/2011 | Calvo | F16K 15/144 |
| | | | | 137/855 |
| 2004/0000501 | A1 | 1/2004 | Shah et al. | |
| 2005/0161093 | A1 | 7/2005 | Takahashi | |
| 2005/0286808 | A1 * | 12/2005 | Zimmerman | B65D 81/2023 |
| | | | | 383/43 |
| 2007/0014492 | A1 * | 1/2007 | Chen | B65D 77/225 |
| | | | | 383/103 |
| 2008/0017818 | A1 * | 1/2008 | Tang | F16K 15/207 |
| | | | | 251/82 |
| 2013/0098785 | A1 | 4/2013 | Steffens | |
| 2014/0373953 | A1 * | 12/2014 | Spanevello | F16K 27/0209 |
| | | | | 137/854 |
| 2015/0013788 | A1 * | 1/2015 | Chen | B65B 31/04 |
| | | | | 137/511 |

FOREIGN PATENT DOCUMENTS

EP           2276679 B1     10/2013
WO    WO2010/130089 A1   11/2010

* cited by examiner

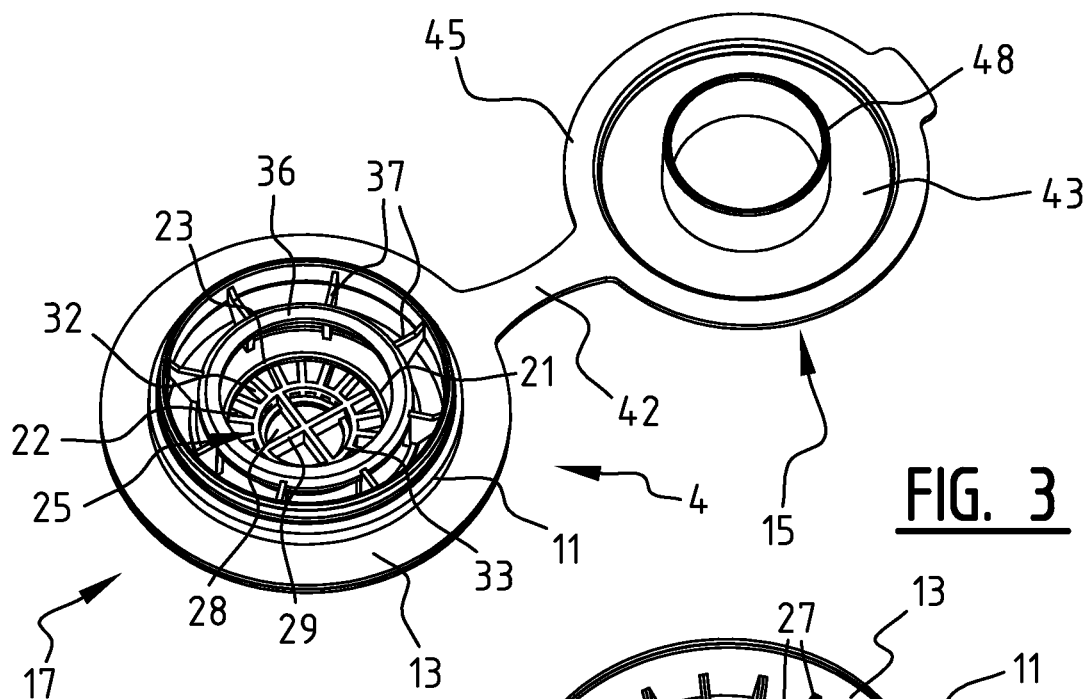
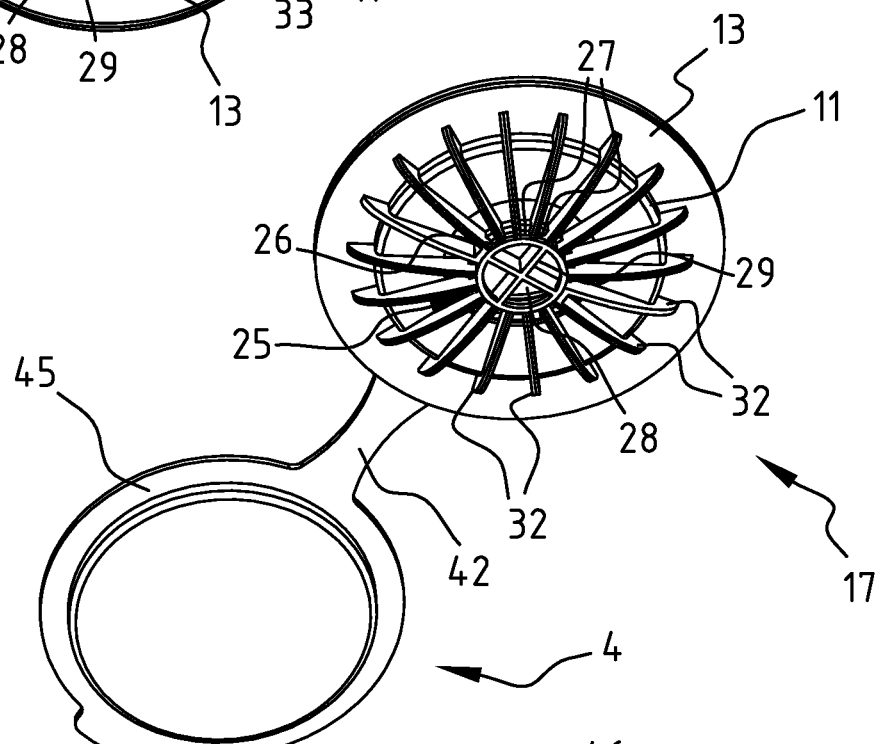
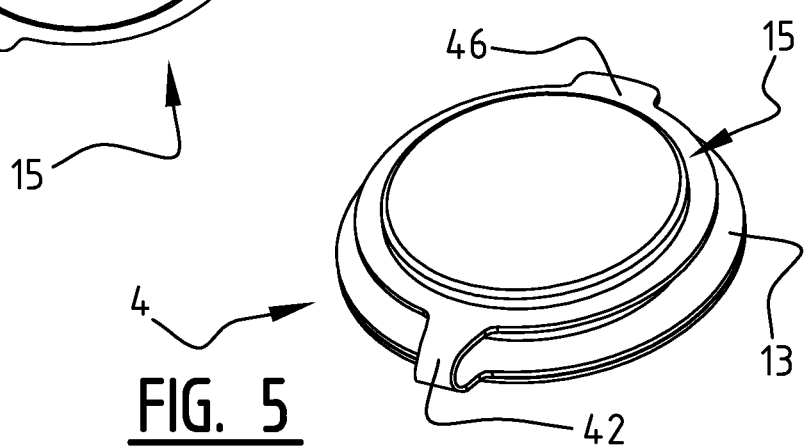
FIG. 3
FIG. 4
FIG. 5

VALVE FOR A FLEXIBLE PACKAGING WITH AN AERATING AND/OR VENTING OPENING AND METHOD FOR AERATING AND/OR VENTING A FLEXIBLE PACKAGING

The invention relates to a valve, in particular for a flexible packaging, comprising a valve housing to be connected to an aerating and/or venting opening of the packaging and having a first opening and a substantially opposite second opening, and a flexible membrane movable between a position which closes the first opening and a position which leaves the first opening clear. Such a valve is known, for instance from EP 2 276 679.

Where reference is made in this text to "aerating" or "venting", this is understood to mean respectively supply of a gas to a packaging and extraction of a gas from a packaging. The gas need not necessarily be air here, but can for instance also be nitrogen or carbon dioxide. Other gas compositions, for instance with an insecticide or a disinfectant, can also be envisaged.

Described in the above stated document EP 2 276 679 is a one-way valve with membrane for use in combination with a vacuum packaging. Such a vacuum packaging is formed by a flexible, gas-tight bag with a closable opening to enable filling of the bag with a product. Formed in the bag is at least one venting opening in which the valve is arranged so as to close it.

A packaging with such a valve can be evacuated via the venting opening, whereby the volume of the product packaged therein decreases, which is advantageous during storage and/or transport. The product in the packaging is in addition fully sealed from the outside atmosphere so that moisture for instance cannot penetrate therein. This is advantageous when dry products are stored in a humid environment. The packaging can in addition be filled with a protective gas, such as nitrogen or carbon dioxide, whereby oxidation of the packaged product is for instance prevented or the storage life thereof is increased. The gas can also suffocate pests or inhibit or prevent fungal growth or the development of bacteria. Vacuum packagings are therefore often applied when products have to be stored for a long time, for instance as transport packaging for tropical products being transported by ship to Europe and the United States.

The one-way valve according to EP 2 276 679 is formed by a valve housing consisting of two annular parts which are attached to each other and define two mutually opposite openings. Enclosed between the annular parts is a tab of a membrane which can thus as it were pivot about the enclosed tab between an open and a closed position. In the closed position the membrane is suctioned with force onto a valve seat by the underpressure prevailing in the packaging, whereby a very good seal is obtained.

This known valve has the drawback that, because the membrane is enclosed on one side, an uneven and limited throughflow opening results when the membrane takes up its open position. Evacuation of the packaging is therefore relatively time-consuming. In addition, the valve is purely a one-way valve which is not suitable for admitting gas into the packaging, for instance in order to increase the storage life of the packaged product, to preserve the quality thereof or to control pests.

A two-way valve for a flexible packaging is known from U.S. Pat. No. 6,056,439. There is therein a valve housing formed by a cup-shaped part with an opening in the bottom and a retaining part with three legs which is clamped with its legs round the edge of the opening. In its closed position a membrane lies on the edge of the opening and is suctioned therefrom when the packaging is vacuumed. The air flows out of the packaging here along the periphery of the membrane. The membrane is further provided with a central incision which, because of the flexibility of the material, remains closed when the membrane takes up its closed position but through which gas can flow into the packaging when the pressure outside the packaging is high enough. This inflowing gas serves to create some space between the packaging and the outer side of the packaged products. The packaging hereby no longer has the exact structure of the packaged products, but has a smooth appearance.

This known two-way valve has the drawback that it is necessary for the throughflow opening via the incision to be limited in order to prevent leakage when the packaging is vacuumed. Admission of gas hereby takes a relatively long time.

The invention now has for its object to provide a valve of the above described type wherein the above stated drawbacks do not occur, or at least do so to lesser extent. According to the invention this is achieved in that the valve is provided with guide means for guiding the movement of the membrane, wherein there is space in the housing adjacently of the membrane for the purpose of forming a passage between the first and second opening when the membrane takes up its open position. Owing to the presence of guide means the membrane performs a controlled movement between its closed position and its opened position, whereby a well-defined opening is created under all conditions. In combination with the space in the housing adjacently of the membrane a relatively large throughflow area is thus created, whereby a packaging can be vacuumed rapidly or can be flushed rapidly by introducing a gas.

The guide means are preferably placed along a periphery of the membrane. The membrane thus need not be pierced for the purpose of receiving parts of the guide.

The guide means can here comprise a number of guide members placed with intermediate spacing along the periphery of the membrane and extending from the first opening in the direction of the second opening. The membrane is guided in reliable manner by using a plurality of guides, while gas can flow through the intermediate spaces between the guides along the membrane during evacuation or flushing of the packaging.

It is on the other hand also possible to envisage the guide means comprising a perforated wall surrounding the membrane. The membrane is hereby guided over a large part of its periphery, whereby a very uniform movement is possible.

The guide means can extend substantially transversely of a main plane of the first opening, so that the membrane can be guided away from the first opening over its whole surface. A relatively large throughflow opening is thus left clear relatively quickly.

The membrane is preferably accessible from the side of the second opening. The membrane can thus be engaged from this side and held in its opened position when gas has to be introduced into the packaging.

This can for instance be achieved when the valve comprises at least one stop protruding partially inside the periphery of the membrane. Such a stop can for instance be formed by a bent end part of a guide or an inward projecting edge of the guide wall. The movement of the membrane in the direction of the second opening is hereby bounded, while a central part of the membrane is left clear.

An even flow through the valve from and to the interior of the packaging is achieved when the housing has a cylindrical outer wall, the membrane is circular and the space between the membrane and the outer wall is annular. This creates a rotation-symmetrical flow pattern without sharp bends.

The first opening is advantageously formed in a bottom of the housing and is connected to a nozzle protruding from the bottom. Such a nozzle, which also functions as spacer, prevents the possibility of the membrane being pressed open by contact with products in the packaging.

In order to then still ensure a good approach flow to the first opening, the nozzle is preferably gas-permeable in both axial and radial direction. One or more openings can thus be arranged in a peripheral wall which defines the nozzle.

When the nozzle is gas-permeable in both axial and radial direction, gas can flow through as well as along the nozzle, whereby the flow through the valve housing is further improved.

When the valve is provided with a filter arranged upstream of the first opening, it can also be applied when fine products, for instance in powder form, are received in the packaging.

A support member can be arranged in the nozzle to support the filter and/or the membrane.

For connection thereof to the aerating and/or venting opening the valve can be provided with a flange arranged around the housing for attachment to a wall of the packaging.

In order to enable easy arrangement of the membrane in the valve the valve housing can be assembled from at least two parts.

Each part of the housing can here advantageously have a flange between which the wall of the packaging can be retained. The valve is thus attached very firmly to the packaging.

In order to protect the membrane from outside influences the valve can be provided with a cover for closing the second opening.

A structurally simple embodiment is obtained here when the cover is connected hingedly to the housing and can be clamped or snapped onto or into the second opening. The cover can here be formed integrally from plastic with the housing, wherein the hinge can be a film hinge.

The invention also relates to a flexible packaging with an aerating and/or venting opening and a valve as described above arranged therein.

The invention further relates to an assembly of an aerating and/or venting device and a valve of the above described type.

In a preferred embodiment of this assembly the aerating and/or venting device comprises a head which connects to an edge of the second opening and which is connected to a gas supply source and/or to an underpressure source. The gas supply can be an air pump, a reservoir with gas under pressure or a pipe network in which a gas circulates. The underpressure source can be a pump, for instance a vacuum pump.

In order to enable vacuuming and/or flushing of the packaging on the one hand and lifting of the membrane from the first opening on the other, the head of the assembly preferably has a first compartment connected to the space adjacent to the membrane and a second compartment connected to a space between the membrane and the second opening.

In combination with the cylindrical embodiment of the valve it is recommended that the first and second compartments are concentric and separated from each other by a cylindrical wall.

When the assembly serves solely for vacuuming of the packaging, the first and second compartments can be connected to a shared underpressure source and the second compartment can be provided with a stop for the membrane. The membrane is in this way lifted from the first opening as soon as the underpressure source is activated, after which gas is drawn out of the packaging via the space around the membrane and the first compartment. The stop here prevents the membrane being suctioned into the head.

When on the other hand the assembly can serve for both vacuuming and flushing of the packaging, a movable suction nozzle for placing into engagement with the membrane can be received in the second compartment, which nozzle can be connected to an underpressure source, although the first compartment can be connected selectively to a gas supply source or to an underpressure source. The membrane is thus lifted from the first opening by the underpressure in the suction nozzle, while gas can be introduced into or extracted from the packaging selectively via the first compartment and the space around the membrane.

As stated, the suction nozzle co-displaces with the membrane to a desired position. This movement option can be realized in structurally simple manner here when the suction nozzle forms part of a concertina.

The invention further relates to a method for at least partially evacuating a flexible packaging. According to the invention such a method comprises the steps of forming a venting opening in a wall of the packaging, closing the opening by means of a valve as described above, connecting to an edge of the second opening of the valve a head of a venting device of the type wherein the first and second compartment are connected to a shared underpressure source, activating the underpressure source, releasing the head from the edge of the second opening, and closing the valve.

Finally, the invention also relates to a method for flushing a flexible packaging with gas. According to the invention this method comprises the following steps of:

forming an aerating and/or venting opening in a wall of the packaging, closing the opening by means of a valve as described above, connecting to an edge of the second opening of the valve a head of an aerating and/or venting device of the type wherein the first compartment is connected selectively to a gas supply source or to an underpressure source, activating the underpressure source connected to the second compartment, connecting the first compartment alternately to the gas supply source and to the underpressure source at least once, releasing the head from the edge of the second opening, and closing the valve.

The suction nozzle can advantageously be brought into engagement with the membrane here prior to activation of the underpressure source connected to the second compartment, and the suction nozzle with the membrane can be moved to a desired position in the housing by the underpressure.

Figure 2:
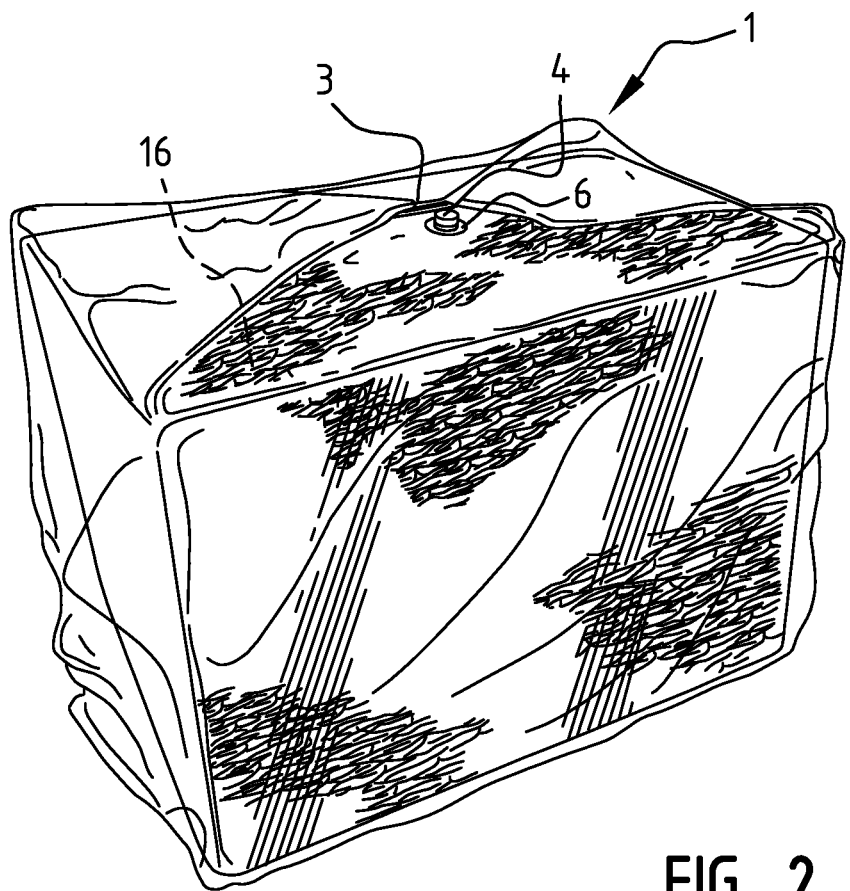
Figure 6:
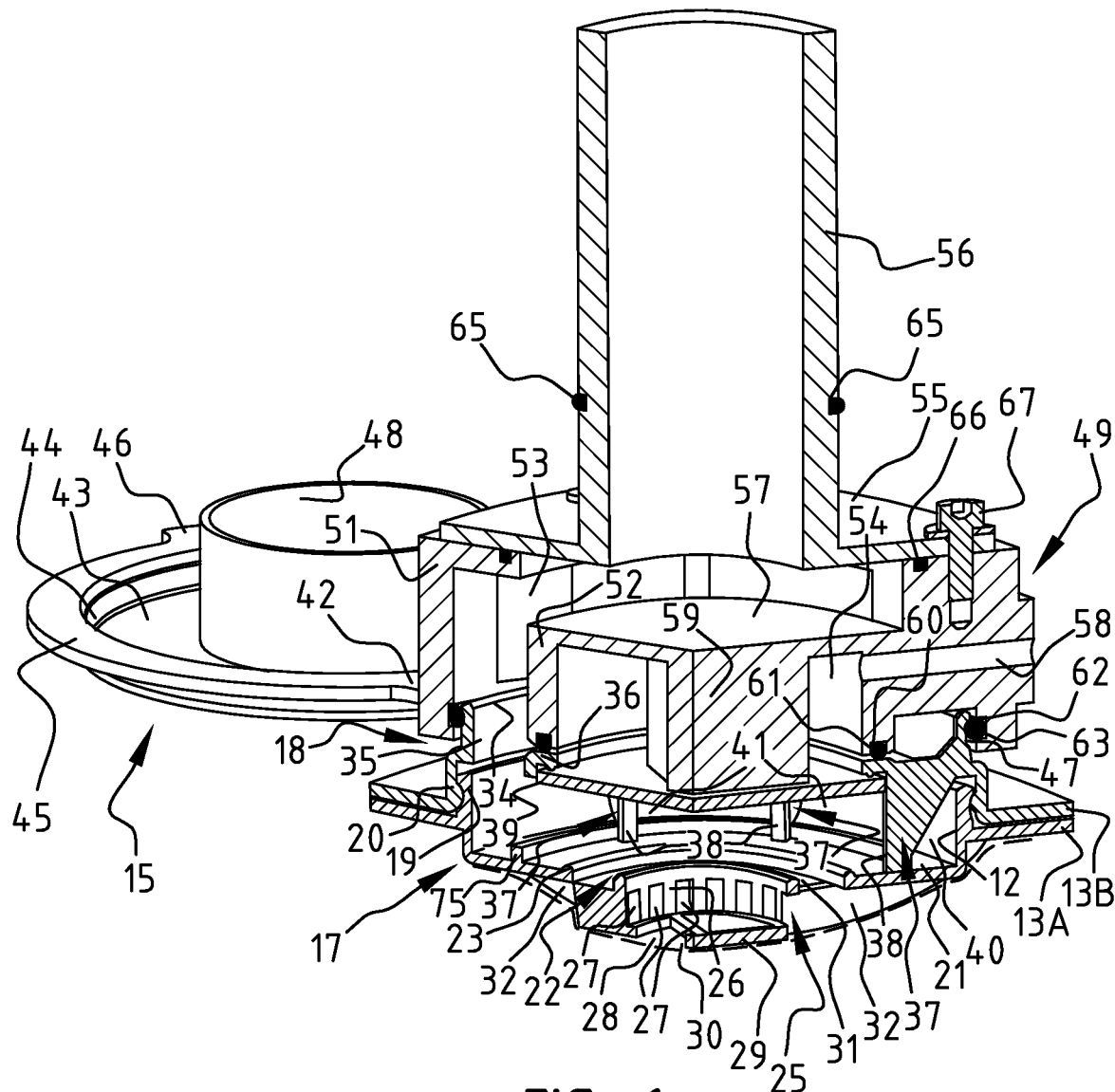
Figure 7:
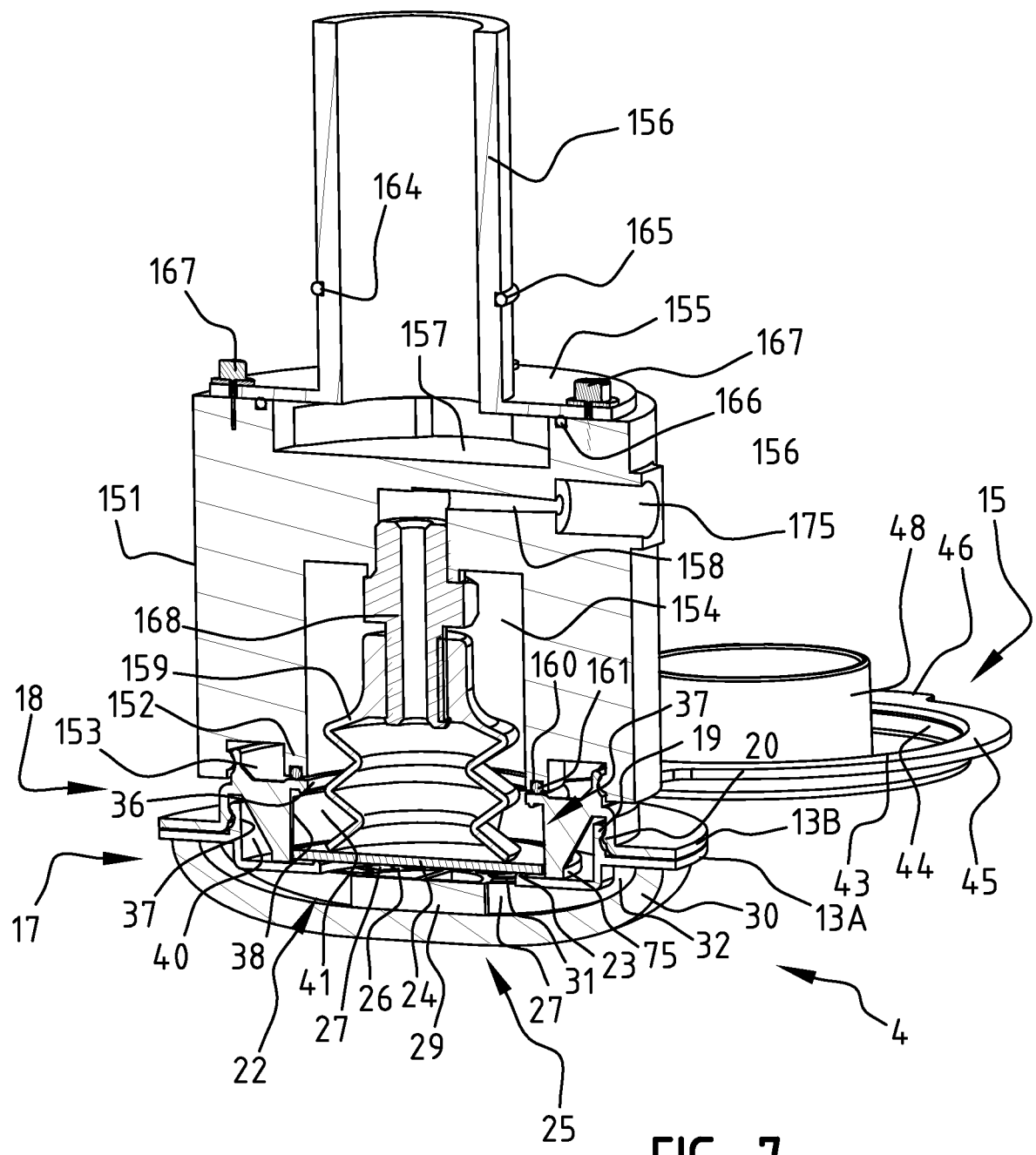
Figure 8:
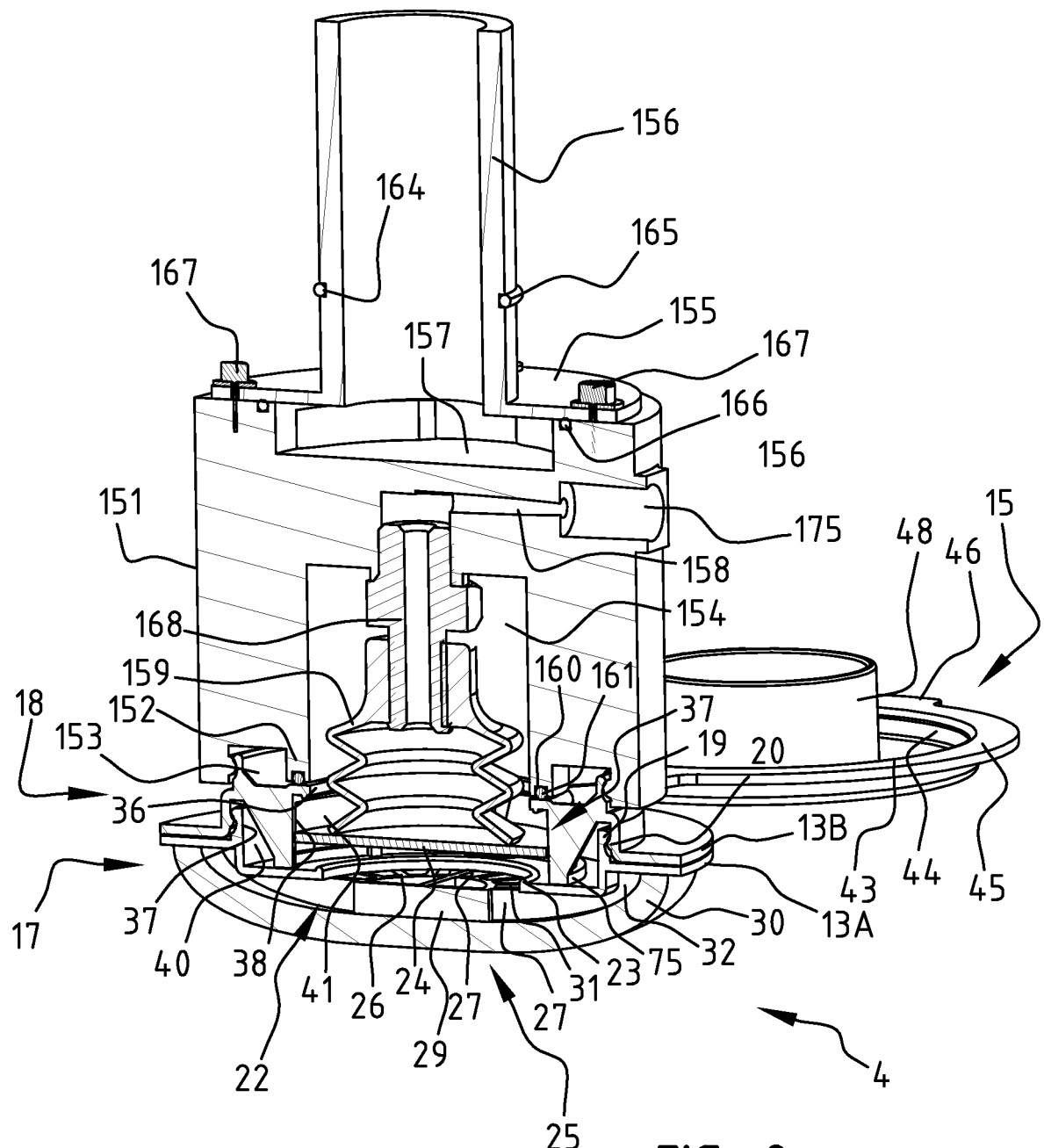
Figure 9:
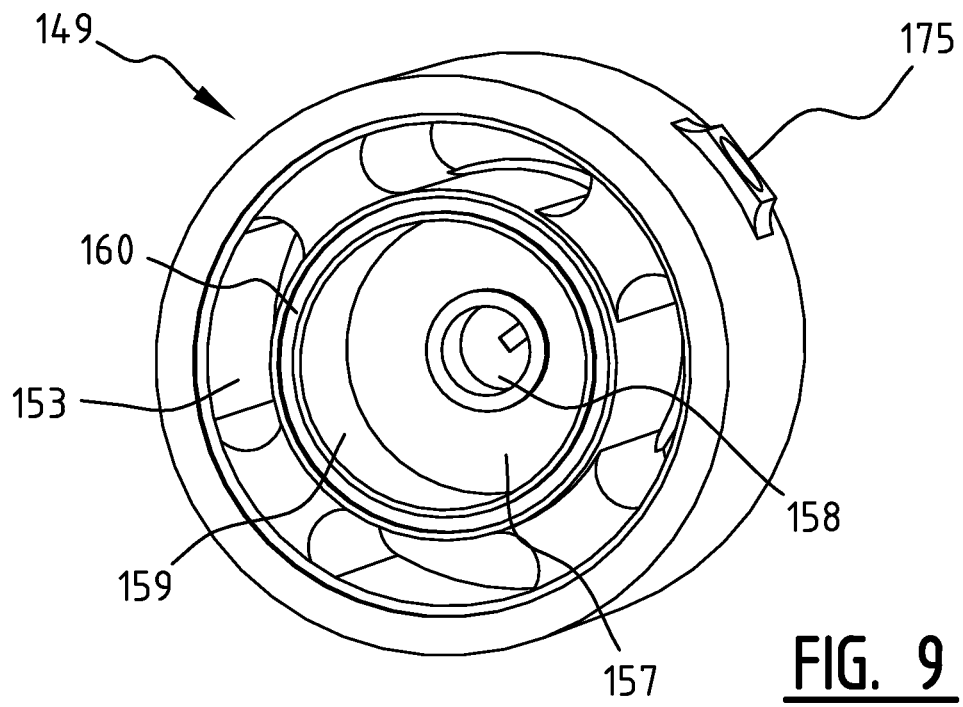
Figure 10:
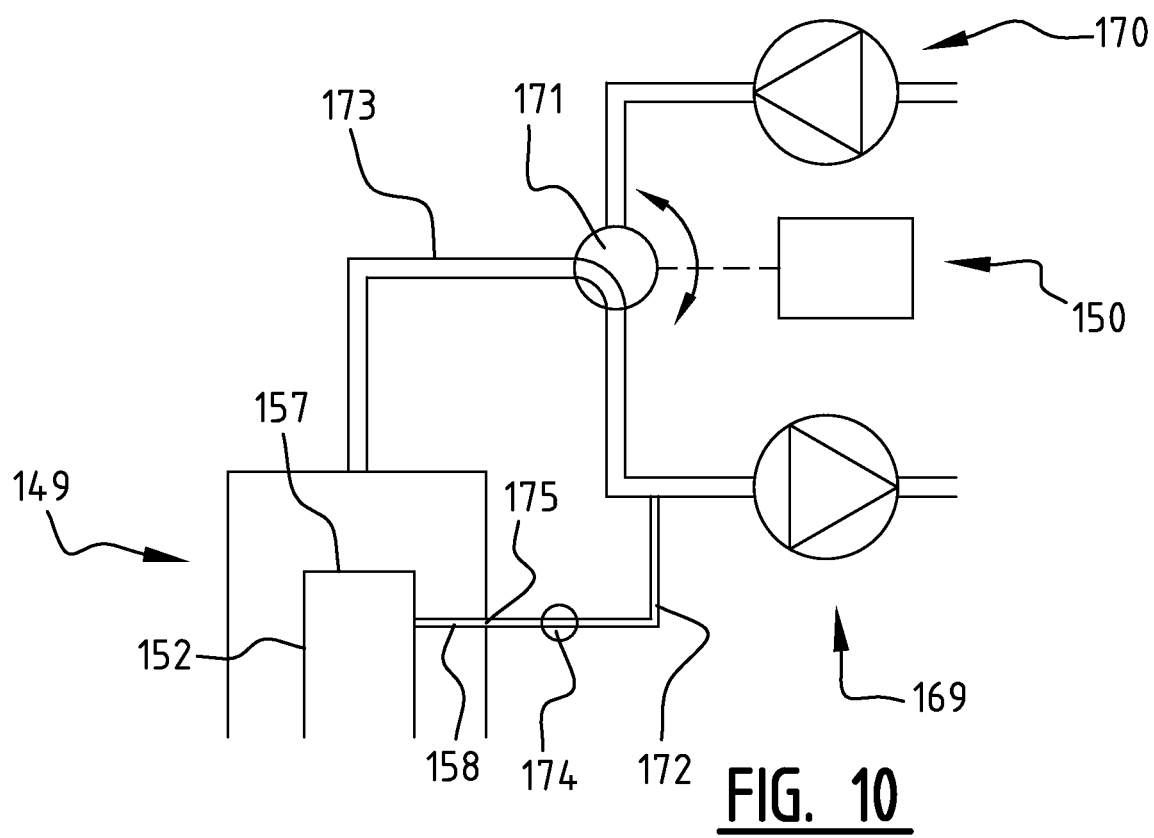

The invention will now be elucidated on the basis of two embodiments, wherein reference is made to the accompanying drawing in which corresponding components are designated with reference numerals increased by 100 and in which:

FIG. 1 shows a view of a flexible packaging which is received in a form-retaining outer packaging before it is filled with products, FIG. 2 is a perspective view of the flexible packaging of FIG. 1 when it has been filled with products and closed but before it has been vacuumed, wherein the outer packaging is omitted, FIG. 3 is a perspective top view of a valve according to the invention in opened state, wherein the membrane is omitted for the sake of clarity, FIG. 4 is a perspective bottom view of the valve of FIG. 3 in open state, FIG. 5 is a perspective top view of the valve of FIGS. 3 and 4 in closed state, FIG. 6 is a partially cross-sectional perspective view of an assembly of the valve of FIG. 3-5 and a venting device connected thereto during venting, FIG. 7 is a view corresponding to FIG. 6 of another embodiment of the assembly, wherein the valve is connected to an aerating and/or venting device, FIG. 8 is a view corresponding to FIG. 7 of an assembly during aerating or venting, FIG. 9 is a perspective bottom view of a head of the aerating and/or venting device, and FIG. 10 is a schematic representation of the aerating and/or venting device of the assembly of FIGS. 7 and 8.

A flexible packaging 1 (FIG. 1) takes the form here of a bag of a gas-tight plastic open on one side. Packaging 1 call be filled with products through open side 2, after which packaging 1 can be closed gas-tightly by mutually connecting or sealing its peripheral edges 3. Use can be made here of techniques such as heat sealing, impulse sealing or ultrasonic sealing. Flexible packaging 1 is further provided with an aerating and/or venting opening 6 in which a valve 4 according to the invention is arranged. In the shown embodiment flexible packaging 1 is received in a form-retaining outer packaging 5, for instance a cardboard box. Other types of outer packaging can also be envisaged, depending on the nature of the product to be packaged. Flexible packaging 1 could thus also be received in a so-called big bag which, while not being form-retaining, does however withstand loads which may occur during transport or storage of flexible packaging 1. In the shown embodiment flexible packaging 1 therefore has no support function but serves only to seal the packaged products gas-tightly from the outside atmosphere.

Once flexible packaging 1 has been filled with products 16 and closed gas-tightly, and upright edges 3 have been folded together (FIG. 2), packaging 1 has to be vacuumed. The gases still present in packaging 1 must for this purpose be extracted. This is important in order to optimally preserve the quality of the packaged products during storage and/or transport. The content of packaging 1 can optionally also be flushed with an (inert) gas or gas mixture. Use is made for this purpose of an aerating and/or venting device which is connected to valve 4. When flexible packaging 1 need only be vacuumed, it is possible to suffice with a venting device only. In the case the interior of packaging 1 also has to be flushed, use has to be made of a device 150 which can not only vent but also aerate (FIG. 10). The construction of valve 4 can be the same in both cases.

Valve 4 has a valve housing 11, which is cylindrical in the shown embodiment, and a flange 13 which protrudes from the outer wall of valve housing 11 and with which valve 4 is attached or sealed to a wall of flexible packaging 1. Flange 13 can be attached to the outer side or to the inner side of flexible packaging 1, although it is also possible to envisage flange 13 taking a divided form and the wall of flexible packaging 1 being retained between the two flange parts. The cylindrical valve housing 11 protrudes through the aerating and/or venting opening 6 formed in the wall of flexible packaging 1. Valve 4 is further provided in the shown embodiment with a cover 15 which is mounted hingedly on valve housing 11 and which is clamped or snapped onto or into the valve housing in its closed position (FIG. 5).

Once this cover 15 has been opened, valve 4 can be connected to a head of an aerating and/or venting device. Packaging 1 can then be vented or vacuumed by suctioning the gas present in packaging 1 therefrom. The packaging will then eventually fit closely to the outer side of the packaged products. The vacuuming can also take place in different steps, wherein the interior of packaging 1 is flushed between two successive suctioning operations by introducing a gas, for instance an inert gas, nitrogen or carbon dioxide, into packaging 1. This gas is then also suctioned out of packaging 1 again after a time, whereby the packaging is in any case partially vacuumed. Some gas will remain behind in the packaging and there provide a protective or low-oxygen atmosphere.

As stated, valve 4 comprises a valve housing 11 which is cylindrical in the shown embodiment and which here comprises two parts, an inner part 17 directed toward the interior of packaging 1 and an outer part 18 directed toward the outside atmosphere. In the shown embodiment both parts 17, 18 of valve housing 11 are manufactured from a form-retaining plastic, although other materials can also be envisaged. In some applications, when the packaged products or gases used are not compatible with plastic, a suitable metal could also be used. An outward facing end edge 19 of inner part 17 is snapped fixedly onto an inward facing end edge 20 of outer part 18. Inner part 17 is substantially cup-shaped and has a cylindrical peripheral wall 12 and a bottom 21 connected thereto. Formed in bottom 21 is a first opening 22 which is surrounded by an upright edge 23 which forms a seat for a flexible membrane 24. This membrane 24, which is manufactured here from an elastically deformable, gas-tight plastic or from a natural or synthetic rubber, seals first opening 22 when it lies against seat 23. Flexible membrane 24 is movable from this sealing position to an open position, in which membrane 24 lies at a distance from the first opening.

A nozzle 25 protrudes from the side of first opening 22 facing toward the interior of packaging 1. This nozzle 25 is cylindrical and has a side wall 26 with openings 27 which bounds an outflow opening 28. Nozzle 25 is thus gas-permeable not only in axial but also in radial direction. Received in outflow opening 28 is a support member 29, in this case a cross, which serves, among other purpose, to support flexible membrane 24 in order to prevent it being suctioned into a concave shape by the underpressure in packaging 1, whereby leakage could occur along its peripheral edge 39. The cross-shaped support member 29 additionally serves to support a filter cloth 30 which is arranged and sealed over the inward facing side of valve 4. This filter cloth 30 serves to prevent parts of the content of packaging 1 being able to enter valve 4, which is a particular risk in the case of products in particle or powder form.

In the shown embodiment nozzle 25 is smaller than first opening 22 so that an annular opening 31 is already formed around nozzle 25. Nozzle 25 is attached to bottom 21 of valve housing 11 by means of a number of radially running ribs 32. An end edge 33 of nozzle 25 forms a second seat for membrane 24. On the one hand a relatively large through-flow area is in this way created, which can be approached both axially and radially by a flow and which will not become blocked by material from the packaging, while on the other a good seal is achieved.

The outer part 18 of housing 11 comprises an edge 34 which bounds a second opening 35. Situated some distance inside this edge 34 is an annular stop 36 which bounds a movement of membrane 24 to be discussed hereinbelow. This stop 36 is connected to peripheral edge 34 by means of a number of supports 37 extending in radial direction between stop 36 and peripheral edge 34. In the shown embodiment each support 37 has a triangular cross-section and also extends in axial direction from stop 36 to bottom 21 of inner part 17 of valve housing 11. The parts of supports 37 extending in axial direction form guide means 38 for guiding the movement of membrane 24.

Guide means 38 co-act with peripheral edge 39 of flexible membrane 24 and ensure that membrane 24 can move uniformly from the closing position, in which it rests on seats 23, 33 and closes first opening 22, to a position in which membrane 24 is in engagement with stop 36 and leaves clear first opening 22 (FIG. 6). In addition, guide means 38 ensure that membrane 24 can in principle be held in stable manner in any intermediate position. Guide means 38 extend roughly perpendicularly of the plane of first opening 22 in the direction of second opening 35. Membrane 24 can thus be moved away from first opening 22 while remaining roughly parallel to the plane of this opening, whereby a large throughflow area is created relatively quickly.

The outer ends of the supports or guide members 38 resting on bottom 21 of inner housing part 17 are otherwise still connected here by means of a peripheral edge 75, whereby deformation is prevented and an optimal guiding is guaranteed under all conditions.

As stated, the supports or guide members 38 extend from stop 36 roughly perpendicularly of the plane of first opening 22. They therefore also lie roughly perpendicularly of bottom 21, and are thereby roughly parallel to peripheral wall 12 of inner housing part 17 and edge 34 of outer housing part 18. An annular space 40 is thus defined between wall 12 and edge 34 on the one hand and guide members 38 on the other. This space 40, which surrounds membrane 24, is connected to the space between membrane 24 and first opening 22—when membrane 24 is lifted off seats 23, 33—via openings 41 between guide members 38. Via this annular space 40 gas can flow relatively quickly and freely from first opening 22 to second opening 35 and vice versa.

As stated, valve 4 is further provided with a flange 13 with which it can be attached, for instance sealed, to the wall of packaging 1. In the shown embodiment flange 13 also takes a two-part form. Inner part 17 of valve housing 11 is provided with an inner flange 13A and outer part 18 with an outer flange 13B. The edge of the aerating and/or venting opening 6 in packaging 1 can thus be clamped between the two parts 13A, 13B of flange 13 when valve 4 is assembled.

As stated, cover 15 is mounted hingedly on valve housing 11. In the shown embodiment cover 15 is formed integrally with the outer housing part 18 and a film hinge 42 is formed between the two components. Cover 15 is embodied as a flat dish with a bottom 43 and a peripheral wall 44. Peripheral wall 44 ends in a flange 45, which serves to enable easy handling of cover 15. Flange 45 also has a protruding tab 46. Wall 44 has a radially inward convex form for the purpose of engaging in a peripheral groove 47 of the outer housing part 18 when cover 15 is closed. Protruding from bottom 43 is a tubular part 48 which is inserted into annular stop 36 when cover 15 is closed.

When a packaging 1, which is filled with products 16 and is then closed gas-tightly, has to be vented or vacuumed, a head 49 of a venting or vacuum device (not further shown here) is connected to valve 4 (FIG. 6). In the shown embodiment this head 49 has a cylindrical outer wall 51 and a cylindrical inner wall 52 placed a distance therefrom, these together bounding two compartments, a substantially annular outer compartment 53 and a substantially cylindrical inner compartment 54 enclosed thereby. A circular end wall 55, from which a cylindrical connector 56 protrudes, is attached to cylindrical outer wall 51 by means of bolts 67. An end of a hose or tube (not shown here), which leads to the actual vacuum device, can be pushed over this connector 56. Inner compartment 54 is closed on its upper side by an end wall 57 and is accessible from the outer side via a channel 58 which passes through outer wall 51. This channel 58 is likewise connected to a hose or tube (not shown here) which runs to vacuum device 50. Further formed in inner compartment 54 is a stop 59 which protrudes from end wall 57 and which serves to prevent excessive movement of membrane 24 when an underpressure is created in inner compartment 54.

Cylindrical inner wall 52 is provided at its free outer end with a groove 60 in which is received an O-ring 61 which connects sealingly to annular stop 36 of outer part 18 of valve housing 11. Formed in similar manner on the inner side of outer wall 51 of head 49 is a groove 62 in which an O-ring 63 is likewise received which engages sealingly in peripheral groove 47 of outer part 18 of valve housing 11. Connector 56 is also provided with a groove 64 with an O-ring 65 for sealing the hose or tube to be pushed thereover. Finally, an O-ring 66 which must prevent leakage is also arranged between outer wall 51 and end wall 55.

When an underpressure is generated in the outer and inner compartments 53, 54 by the venting or vacuum device, membrane 24 of seat 23 on bottom 21 is lifted and, guided by guide means 38, moves in plane position to annular stop 36 where the movement is stopped by both stop 36 of valve 4 and stop 59 of head 49. Gas is then extracted from packaging 1 and flows via nozzle 25 and first opening 22 into the space bounded by the opened membrane 24 and guide means 38. From here the gas flows between guide members 38 to the surrounding space 40 and subsequently along wall 12 and edge 34 to the outer compartment 53 of head 49. From there the gas is discharged via connector 56 and the tube or hose connecting thereto. When the underpressure is released, membrane 24 is drawn in by the underpressure prevailing in packaging 1 and is suctioned against seats 23, 33 and cross 29. First opening 22 is hereby closed and packaging 1 closed gas-tightly. Head 49 can then be released from valve 4, and cover 15 of valve 4 can be closed.

When packaging 1 must not only be vented but also flushed with for instance an inert or other type of protective gas, an aerating and/or venting device 150 can be connected to valve 4 (FIG. 10). Such a device has a different type of head 149 (FIG. 7), wherein received in inner compartment 154 instead of a stop is a movable suction nozzle 159 which is brought into engagement with membrane 24. This movable suction nozzle 159 is embodied here as a concertina which is connected to a tube piece 168 mounted in inner compartment 154. This tube piece 168 is in turn connected, via a channel 158 which passes through a separating wall 157 and debouches into a connection 175, to a conduit 172 with shut-off valve 174 (FIG. 10) which runs to an underpressure source, for instance a vacuum part 169 of aerating and/or venting device 150. In this embodiment outer compartment 153 is in turn connected to a connector 156, which is in turn connected to a hose or tube 173. This hose or tube 173 is however not only connected to an underpressure source here, but can also be connected selectively to a source 170 for the supply of gas.

The operation of this assembly is thus as follows. When head 149 is pressed onto valve 4, the resilient concertina 159 which protrudes outside the plane of head 149 through annular stop 36 presses against membrane 24. When tube piece 168 is now connected to an underpressure source, such as vacuum part 169 of aerating and/or venting device 150, by shut-off valve 174 being opened, concertina 159 is contracted counter to its resilience and membrane 24 is lifted from seats 23, 33. First opening 22 is hereby left clear, and gas can selectively be extracted from or introduced into the packaging. The position of membrane 24 between first opening 22 and stop 36 is determined here by the ratio of the applied underpressure and the stiffness or resilience of concertina 159. Membrane 24 can be placed in any desired position between the fully closed position and the extreme position determined by stop 36 by varying the underpressure. The throughflow opening can thus be controlled.

By switching a three-way valve 171 the outer compartment 153 can then be connected to underpressure source 169 or gas supply 170. Gas can for instance hereby first be extracted from the packaging by switching valve 171 such that the tube or hose 173 is connected to underpressure source 169 (shown schematically as a pump). The gas then flows out of the packaging through valve 4, head 149 and hose or tube 173 to underpressure source 169, whereby the packaging is vacuumed. By then switching the valve 171 the tube or hose 173 is connected to gas supply 170, after which an inert or other type of protective or active gas can then be blown into the packaging via head 149 and valve 4. This gas can then be drawn off again by switching three-way valve 171, after which the packaging can finally be closed by releasing the underpressure from concertina 159 by closing shut-off valve 174. Membrane 24 will then be moved back to seats 23, 33 by the resilience of concertina 159 in combination with the underpressure then prevailing in the packaging, whereby first opening 22 is closed. Head 149 can then be released from valve 4, and cover 15 can be closed again.

The invention in this way allows a gas-tight packaging filled with products to be vented or flushed with a protective or otherwise active gas in a relatively short time.

Although the invention has been elucidated above on the basis of a number of embodiments, it will be apparent that it can be varied in many ways. The shape and dimensions of the different openings and of the valve housing can thus be other than shown here. Although a cylindrical valve housing is shown here in combination with round openings and a round membrane, the shape of the valve housing need not correspond to the shape of the openings. Nor does the space adjacently of the membrane need be concentric with the membrane. The valve housing can also be constructed from more or fewer individual components than shown here, while the division of the functions over the components can also be different. The guide members can for instance be formed integrally with the inner instead of the outer housing part. The guide means could be embodied differently than in these embodiments. It is possible to envisage a wall which encloses the membrane and which has perforations. The shape and size of the membrane can also be varied, as can the materials used.

The scope of the invention is therefore defined solely by the following claims.

The invention claimed is:

1. Valve for a flexible packaging, the valve comprising:
a valve housing to be connected to an aerating and/or venting opening of the packaging and having a first opening and an opposite second opening;
a flexible membrane adapted to be freely movable between a closed position in which the flexible membrane closes the first opening and a position which leaves the first opening clear, the membrane configured to be moved to its closed position solely by an underpressure in the packaging; and
guide means for guiding movement of the membrane, wherein there is space in the housing adjacent to the membrane for the purpose of forming a passage between the first and second openings when the membrane takes up its open position;
wherein an entire surface of the membrane is accessible from a side of the second opening so as to be engaged from this side and held in its open position when gas is introduced into the packaging through the valve; and
wherein the valve comprises at least one stop protruding partially inside a periphery of the membrane, said at least one stop being arranged to bound movement of the membrane in a direction of the second opening while leaving clear a central part of the membrane.

2. Valve as claimed in claim 1, wherein the guide means are placed along the periphery of the membrane.

3. Valve as claimed in claim 2, wherein the guide means comprise a number of guide members placed with intermediate spacing along the periphery of the membrane and extending from the first opening in the direction of the second opening.

4. Valve as claimed in claim 2, wherein the guide means comprise a perforated wall surrounding the membrane.

5. Valve as claimed in claim 2, wherein the guide means extend transversely relative to a main plane of the first opening.

6. Valve as claimed in claim 1, wherein the housing has a cylindrical outer wall, the membrane is circular and a space between the membrane and the outer wall is annular.

7. Valve as claimed in claim 1, wherein the first opening is formed in a bottom of the housing and is connected to a nozzle protruding from the bottom.

8. Valve as claimed in claim 1, wherein the nozzle is gas-permeable in both axial and radial directions.

9. Valve as claimed in claim 1, further comprising a filter arranged upstream of the first opening.

10. Valve as claimed in claim 1, further comprising a flange arranged around the housing for attachment to a wall of the packaging.

11. Valve as claimed in claim 1, wherein the housing is assembled from at least two parts, and wherein each part of the housing has a flange between which a wall of the packaging can be retained.

12. Valve as claimed in claim 1, further comprising a cover for closing the second opening.

13. Flexible packaging with an aerating and/or venting opening and a valve as claimed in claim 1 arranged therein.

14. Assembly of an aerating and/or venting device and a valve as claimed in claim 1, wherein the aerating and/or venting device comprises a head which connects to an edge of the second opening and which is connected to a gas supply source and/or to an underpressure source.

15. Assembly as claimed in claim 14, wherein the head has a first compartment connected to the space adjacent to the membrane and a second compartment connected to a space between the membrane and the second opening.

16. Assembly as claimed in claim 15, wherein the first and second compartments are concentric and separated from each other by a cylindrical wall.

17. Assembly as claimed in claim 15, wherein:
the first and second compartments are connected to a shared underpressure source and the second compartment is provided with a stop for the membrane; or
a movable suction nozzle for placing into engagement with the membrane is received in the second compartment, which nozzle is connected only to the underpressure source, and the first compartment is connected selectively to the gas supply source or to the underpressure source.

18. Method for at least partially evacuating a flexible packaging, the method comprising:
forming a venting opening in a wall of the packaging,
closing the opening by means of a valve comprising:
a valve housing to be connected to the venting opening of the packaging and having a first opening and an opposite second opening;
a flexible membrane adapted to be freely movable between a closed position in which the flexible membrane closes the first opening and a position which leaves the first opening clear, the membrane configured to be moved to its closed position solely by an underpressure in the packaging; and
guide means for guiding movement of the membrane, wherein there is space in the housing adjacent to the membrane for the purpose of forming a passage between the first and second openings when the membrane takes up its open position,
wherein an entire surface of the membrane is accessible from a side of the second opening so as to be engaged from this side and held in its open position when gas is introduced into the packaging through the valve; and
wherein the valve comprises at least one stop protruding partially inside a periphery of the membrane, said at least one stop being arranged to bound movement of the membrane in a direction of the second opening while leaving clear a central part of the membrane,
connecting to an edge of the second opening of the valve a head of a venting device as claimed in claim 17,
activating the underpressure source,
releasing the head from the edge of the second opening, and
closing the valve.

19. Method for flushing a flexible packaging with gas, the method comprising:
forming an aerating and/or venting opening in a wall of the packaging,
closing the opening by means of a valve comprising:
a valve housing to be connected to the aerating and/or venting opening of the packaging and having a first opening and an opposite second opening;
a flexible membrane adapted to be freely movable between a closed position in which the flexible membrane closes the first opening and a position which leaves the first opening clear, the membrane configured to be moved to its closed position solely by an underpressure in the packaging; and
guide means for guiding movement of the membrane, wherein there is space in the housing adjacent to the membrane for the purpose of forming a passage between the first and second openings when the membrane takes up its open position,
wherein an entire surface of the membrane is accessible from the side of the second opening so as to be engaged from this side and held in its open position when gas has to be introduced into the packaging through the valve; and
wherein the valve comprises at least one stop protruding partially inside a periphery of the membrane, said at least one stop being arranged to bound movement of the membrane in a direction of the second opening while leaving clear a central part of the membrane,
connecting to an edge of the second opening of the valve a head of an aerating and/or venting device as claimed in claim 17,
bringing the movable suction nozzle into engagement with the membrane,
activating the underpressure source connected to the suction nozzle,
connecting the first compartment alternately to the gas supply source and to the underpressure source at least once,
releasing the head from the edge of the second opening, and
closing the valve.

\* \* \* \* \*